(12) United States Patent
Shiosaki

(10) Patent No.: US 10,994,836 B2
(45) Date of Patent: May 4, 2021

(54) FEATHERING PROPELLER CLUTCH MECHANISMS

(71) Applicant: Amazon Technologies, Inc., Seattle, WA (US)

(72) Inventor: Dominic Timothy Shiosaki, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1045 days.

(21) Appl. No.: 14/966,493

(22) Filed: Dec. 11, 2015

(65) Prior Publication Data

US 2017/0166302 A1 Jun. 15, 2017

(51) Int. Cl.
*B64C 27/14* (2006.01)
*B64C 27/32* (2006.01)
(Continued)

(52) U.S. Cl.
CPC .............. *B64C 27/14* (2013.01); *B64C 11/02* (2013.01); *B64C 11/06* (2013.01); *B64C 11/325* (2013.01);
(Continued)

(58) Field of Classification Search
CPC ....... B64C 11/325; B64C 27/30; B64C 27/45; B64C 27/51; B64C 11/02; B64C 11/04;
(Continued)

(56) References Cited

U.S. PATENT DOCUMENTS

| | | | | |
|---|---|---|---|---|
| 783,163 A | * | 2/1905 | Winn ........................ | F04B 9/02 416/32 |
| 1,834,350 A | * | 12/1931 | Schroeder ............. | B64C 11/346 416/46 |

(Continued)

FOREIGN PATENT DOCUMENTS

| | | |
|---|---|---|
| DE | 545053 | 2/1932 |
| DE | 8701950 U1 | 5/1987 |

(Continued)

OTHER PUBLICATIONS

Wikipedia.com, "Clutch"; https://en.wikipedia.org/wiki/Clutch, accessed Mar. 5, 2018.*

(Continued)

*Primary Examiner* — Joshua J Michener
(74) *Attorney, Agent, or Firm* — Athorus, PLLC

(57) ABSTRACT

Aerial vehicles are equipped with propellers having clutch mechanisms that contract around a shaft when the propellers are not rotating, or are rotating at low angular velocities, and expand around the shaft when the propellers are rotating at sufficiently high angular velocities. The clutch mechanisms surround one or more fixed posts within an opening or window defined therein. When the clutch mechanisms contract into a closed position, components of the clutch mechanisms come into contact with the posts, and the propellers are forced to remain in an alignment defined by the posts. When the clutch mechanisms expand into an open position, such components may rotate freely without contacting the posts. The clutch mechanisms cause propellers to remain (Continued)

aligned in desired orientations when the propellers are not required for operation, thereby reducing drag or adverse acoustic effects.

20 Claims, 11 Drawing Sheets

(51) Int. Cl.
B64D 35/00 (2006.01)
B64C 11/06 (2006.01)
B64C 11/32 (2006.01)
B64C 11/02 (2006.01)
B64C 39/02 (2006.01)
B64C 29/00 (2006.01)
B64C 27/57 (2006.01)

(52) U.S. Cl.
CPC .............. B64C 27/32 (2013.01); B64C 27/57 (2013.01); B64C 29/0025 (2013.01); B64C 39/024 (2013.01); B64D 35/00 (2013.01); B64C 2201/021 (2013.01); B64C 2201/024 (2013.01); B64C 2201/027 (2013.01); B64C 2201/108 (2013.01)

(58) Field of Classification Search
CPC ..... B64C 11/385; B64C 27/025; B64C 27/12; B64C 27/14; B64C 27/32; B64C 27/37; B64C 11/28; B64C 27/48; B64C 27/50; B64C 27/57; F16D 71/00
See application file for complete search history.

(56) References Cited

U.S. PATENT DOCUMENTS

| 1,903,628 | A | * | 4/1933 | Landrum | B64C 11/36 |
| | | | | | 416/139 |
| RE18,957 | E | * | 9/1933 | Gobereau et al. | B64C 11/346 |
| | | | | | 416/53 |
| 2,464,234 | A | * | 3/1949 | Jacobs | B63H 13/00 |
| | | | | | 416/136 |
| 3,422,700 | A | | 1/1969 | Wittwer | |
| 3,715,016 | A | * | 2/1973 | Frieder | F16D 59/00 |
| | | | | | 188/184 |
| 3,891,347 | A | * | 6/1975 | Jacobs | F03D 15/00 |
| | | | | | 416/169 R |
| 4,297,075 | A | * | 10/1981 | Jacobs | F03D 7/0216 |
| | | | | | 416/14 |
| 4,802,872 | A | * | 2/1989 | Stanton | B63H 1/28 |
| | | | | | 416/93 A |
| 4,909,703 | A | * | 3/1990 | Jacobs | F03D 7/0224 |
| | | | | | 416/135 |
| 6,550,719 | B2 | * | 4/2003 | Konig | B64C 11/28 |
| | | | | | 244/16 |
| 9,878,784 | B2 | * | 1/2018 | Erdozain, Jr. | B64C 27/12 |
| 2002/0154997 | A1 | * | 10/2002 | Elliott | B64C 11/325 |
| | | | | | 416/61 |
| 2006/0140769 | A1 | * | 6/2006 | Frampton | F04D 25/088 |
| | | | | | 416/210 R |
| 2006/0171810 | A1 | * | 8/2006 | Travere | F03D 7/0224 |
| | | | | | 416/132 B |
| 2006/0237581 | A1 | * | 10/2006 | Gerbino | B64C 27/022 |
| | | | | | 244/17.11 |
| 2008/0095627 | A1 | | 4/2008 | Castillo | |
| 2013/0084180 | A1 | * | 4/2013 | Conley | F04D 29/364 |
| | | | | | 416/1 |
| 2013/0118856 | A1 | * | 5/2013 | Long | F16D 43/18 |
| | | | | | 192/104 B |
| 2014/0178199 | A1 | * | 6/2014 | Wiinikka | B64C 27/51 |
| | | | | | 416/1 |
| 2015/0008857 | A1 | | 1/2015 | Firanski et al. | |
| 2015/0367935 | A1 | * | 12/2015 | Long | B64C 27/32 |
| | | | | | 416/33 |
| 2016/0059960 | A1 | * | 3/2016 | Fearn | B64C 27/022 |
| | | | | | 244/17.11 |

FOREIGN PATENT DOCUMENTS

| JP | S48002739 A | 1/1973 |
| JP | S60090571 | 6/1985 |
| JP | H02044142 U | 2/1990 |
| JP | 2014526412 A | 10/2014 |
| WO | 2013066477 A2 | 5/2013 |
| WO | 2013074603 A1 | 5/2013 |
| WO | 2015173087 A1 | 11/2015 |

OTHER PUBLICATIONS

International Search Report and Written Opinion for PCT Application No. PCT/US2016/065321 dated Oct. 4, 2017.
Search Report dated Oct. 27, 2020, for corresponding CN Application No. 201680072495.6.

* cited by examiner

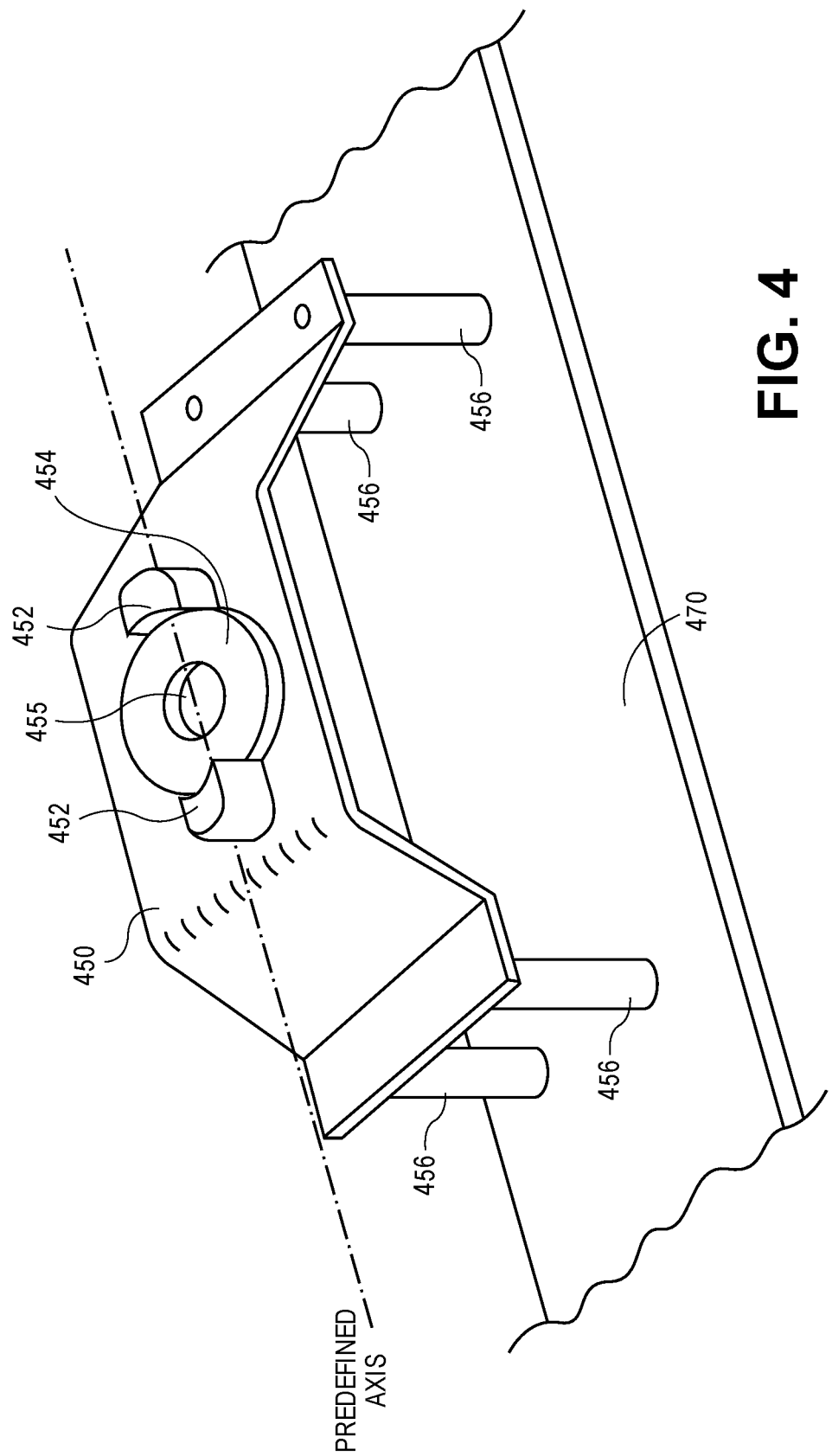

FEATHERING PROPELLER CLUTCH MECHANISMS

BACKGROUND

The use of unmanned aerial vehicles such as helicopters having two or more propellers is increasingly common. Such vehicles, which may include quad-copters (e.g., a helicopter having four rotatable propellers), octo-copters (e.g., a helicopter having eight rotatable propellers), or other vertical take-off and landing (or VTOL) aircraft having two or more propellers, are frequently utilized in numerous personal, commercial or industrial applications.

The availability of excess lift is most essential during take-off and landing evolutions of an unmanned aerial vehicle. Precision control of altitude is critical when an unmanned aerial vehicle attempts to take off from or land at a given location, in order to enable the unmanned aerial vehicle to avoid any surrounding objects, structures, animals (e.g., humans) or other unmanned aerial vehicles that may be located nearby. Accordingly, multi-rotor unmanned aerial vehicles are commonly equipped with greater lift capacity than is commonly utilized or required during most transiting operations, in order to ensure that sufficient lift is available when needed, primarily in take-offs or landings.

In order to conserve onboard electrical power when excess lift is not desired, the powered rotation of one or more propellers of a unmanned aerial vehicle may be shut down when the unmanned aerial vehicle is transiting, or in a thrust mode, such as after the unmanned aerial vehicle has successfully taken off, and recommenced when the unmanned aerial vehicle prepares to land at a given location. For example, an unmanned aerial vehicle may feature sets of thrust propellers and lift propellers. When a maximum amount of lift is desired, both the thrust propellers and the lift propellers may be operated. When the maximum amount of lift is no longer desired, however, the operation of the lift propellers may be stopped, thereby reducing the amount of electrical power consumed during operations. A propeller that is provided on an operating unmanned aerial vehicle and is at rest may create undesirable drag, however, and restrict the stability of the unmanned aerial vehicle during transiting operations.

BRIEF DESCRIPTION OF THE DRAWINGS

FIG. 4 is a view of aspects of a propeller clutch mechanism in accordance with embodiments of the present disclosure.

DETAILED DESCRIPTION

Figure 1A:
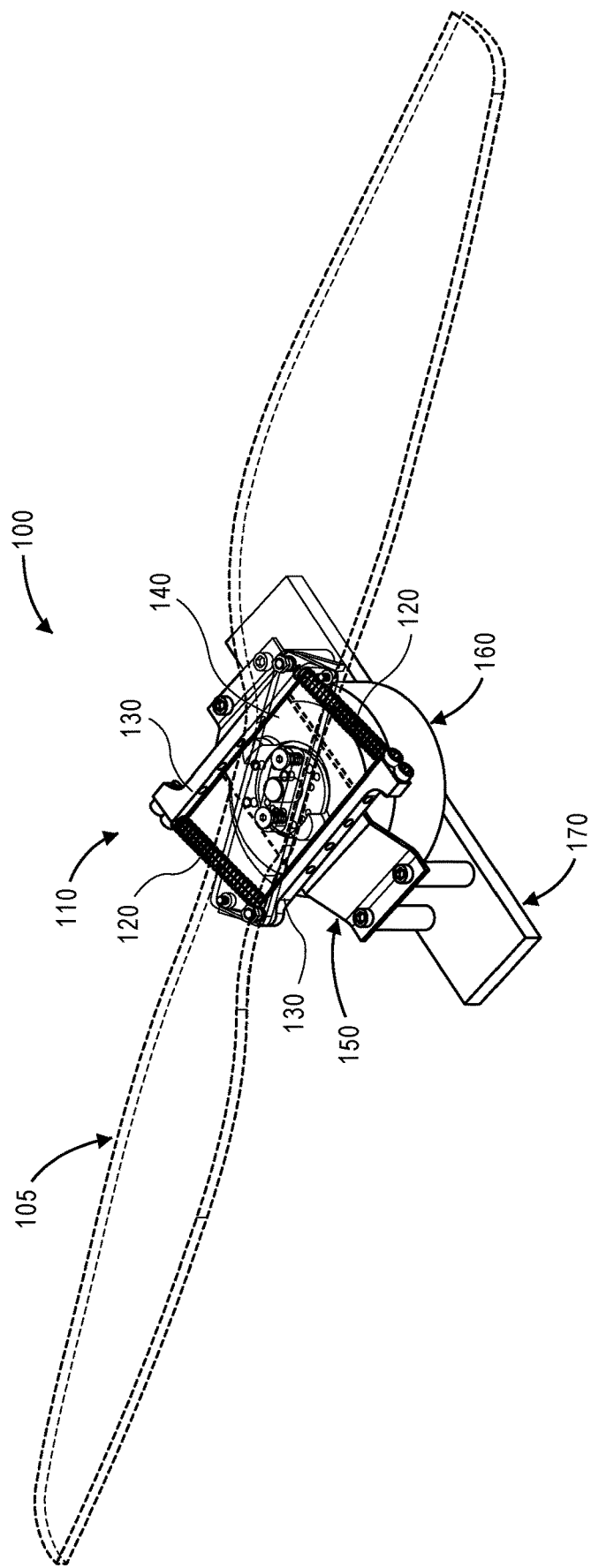
FIGS. 1A through 1D are views of aspects of a vehicle including a propeller clutch mechanism in accordance with embodiments of the present disclosure.

As is set forth in greater detail below, the present disclosure is directed to propeller clutch mechanisms. More specifically, the systems and methods disclosed herein are directed to spring-biased mechanisms that are mounted in association with propeller blades, e.g., to an attachment plate provided on an underside of a propeller blade. In some embodiments, an aerial vehicle, e.g., an unmanned aerial vehicle, includes a motor having a shaft for rotating a propeller. The shaft extends through a base having one or more posts (or shoulders) that define an axis along which the propeller is to be substantially aligned when the rotation of the propeller is no longer desired. A spring-biased clutch mechanism having a pair of feathering arms (or locking arms) that are rotatably mounted to the propeller and linked by tension springs or other biasing elements is mounted to a planar surface of the propeller, and surrounds a point at which the propeller is joined to the shaft.

When the propeller is not rotating, the feathering arms contract around the shaft, and form a narrow channel within which the posts of the base are received. Thus, when the posts of the base are received within the narrow channel, and the motor is off, the propeller remains substantially aligned along the axis defined by the posts. When the motor is started, and the propeller begins to rotate, the feathering arms are forced open by contact between such arms and the posts until the propeller reaches a sufficiently high angular velocity, e.g., when the angular velocity of the propeller exceeds a predetermined threshold. When the propeller is spinning under power at an angular velocity consistent with normal operations, the biasing force provided by the biasing element is fully overcome by centrifugal forces acting on the feathering arms, and the feathering arms eventually remain open, free of contact with the posts. When the motor is stopped, and the angular velocity of the propeller falls below a predetermined threshold, the feathering arms will begin to contract again before coming into contact with the posts, and the propeller will eventually come to a stop, aligned along the axis defined by the posts.

Therefore, in accordance with the present disclosure, a spring-biased clutch mechanism may have a closed position in which feathering arms narrowly surround one or more posts mounted to a base, and cause the propeller to remain in an axial orientation defined by the posts, and an open position in which the feathering arms extend beyond the posts, enabling the propeller to rotate freely about a shaft at a sufficiently high rotational velocity. The spring-biased clutch mechanisms may therefore cause a propeller to be aligned in a predefined orientation (e.g., along a predefined axis) when a motor to which the propeller is joined is not operating, without the use of any further electrical or mechanical devices or components. The predefined orientation may be selected on any basis, including but not limited to drag, acoustic or other operational considerations.

Referring to FIGS. 1A through 1D, portions of an aerial vehicle 100 are shown. The aerial vehicle 100 includes a propeller 105, a clutch mechanism 110, a base 150, a motor 160 and a motor mount 170. The propeller 105 is rigidly joined to the motor 160 by a shaft 165 that causes the propeller 105 to rotate in response to a motive force provided by the motor 160. The clutch mechanism 110 is mounted to an attachment plate 140, which is itself mounted to one side (e.g., an underside) of the propeller 105. The propeller 105 and the attachment plate 140 are shown in broken lines.

Figure 1B:
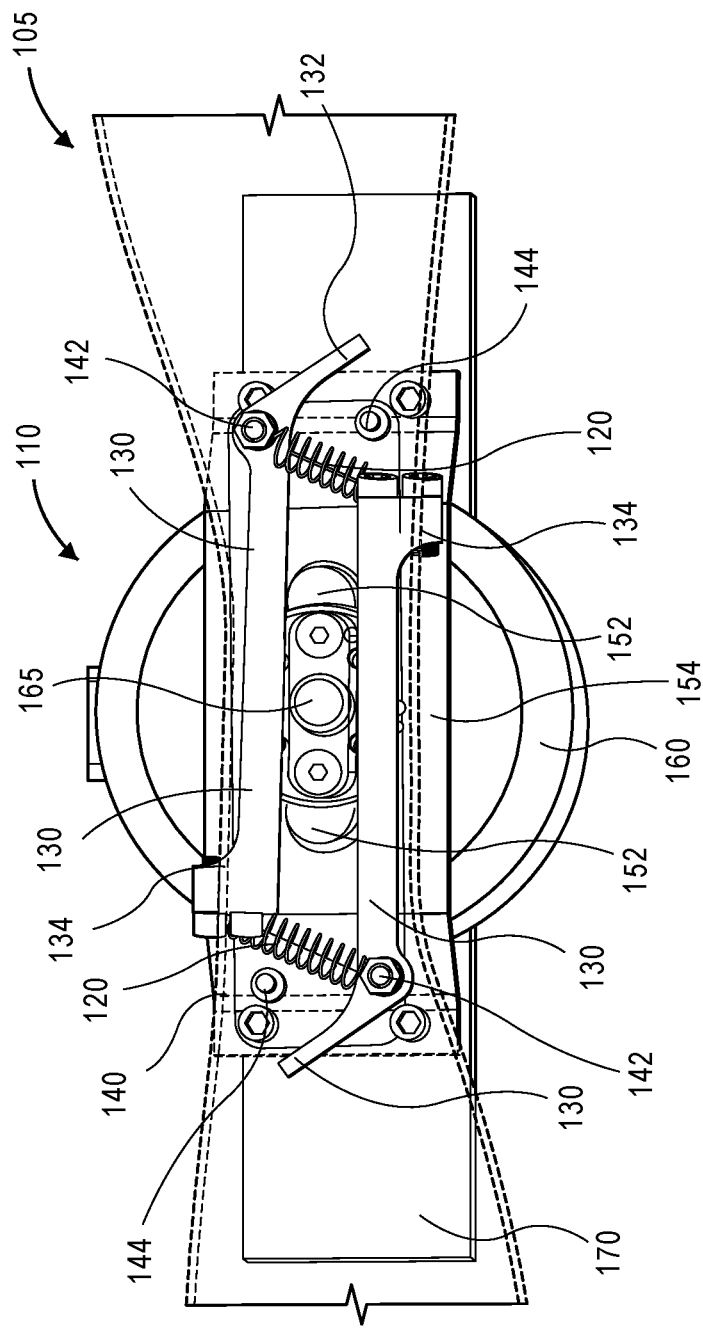

As is shown in FIGS. 1A through 1D, the clutch mechanism 110 includes a pair of tension springs 120 and a pair of feathering arms 130. Each of the feathering arms 130 shown in FIGS. 1A through 1D has an angled or tapered shape, e.g., similar to that of a traditional hockey stick, defining an obtuse angle of approximately one hundred thirty-five degrees (135°). As is shown in FIG. 1B, each of the feathering arms 130 includes a tapered end 132 and a weighted end 134. The feathering arms 130 are rotatably or pivotably mounted to the attachment plate 140 using a fastener 142 of any kind, e.g., threaded screws, nuts, bolts, brads, or any other suitable component by which the feathering arms 130 may be rotatably joined to the attachment plate 140.

The feathering arms 130 may be formed from any suitable materials. In some embodiments, the feathering arms 130 may be formed of lightweight metals such as aluminum, metals of heavier weights including alloys of steel, composites, or any other combinations of materials. In some other embodiments, the feathering arms 130 may be formed from one or more plastics (e.g., thermosetting plastics such as epoxy or phenolic resins, polyurethanes or polyesters, as well as polyethylenes, polypropylenes or polyvinyl chlorides) or woods (e.g., woods with sufficient strength properties such as ash). In still other embodiments, the feathering arms 130 may be formed from other materials including but not limited to carbon fiber, graphite, machined aluminum, titanium, or fiberglass.

Moreover, portions of the feathering arms 130, including but not limited to the tapered end 132 or the weighted end 134, may have any suitable dimensions. For example, as is shown in FIGS. 1A through 1D, the weighted ends 134 of the feathering arms 130 may have lengths, widths and/or cross-sectional areas that are larger than the tapered ends 132 of the feathering arms 130. The weighted ends 134 may be subjected to greater centrifugal forces than the tapered ends 132 when the feathering arms 130 are rotated at a sufficiently high angular velocity. In some embodiments, the weighted ends 134 may include further components such as screws or other fasteners that increase the masses at the corresponding ends of the feathering arms 130. Alternatively, in some other embodiments, the weighted ends 134 may be formed from a material having a greater density than a material from which the tapered ends 132 are formed, and the weighted ends 134 may have the same lengths, widths and/or cross-sectional areas as the tapered ends 132, thereby also causing the weighted ends 134 to be subjected to greater centrifugal forces when the feathering arms 130 rotate at a significantly high angular velocity. The material composition and/or dimensions of the feathering arms 130 may be manipulated in any manner in order to cause one or more of the operations or effects described herein when the propeller 105 is rotating or stationary.

Each of the tension springs 120 may be any type or form of spring or other biasing element to provide a biasing force for urging one of the respective tensioning arms 130 into a contracted position about the shaft 165. As is shown in FIG. 1B, each of the tensioning springs 120 is joined at a first end to the fastener 142 rotatably mounting one of the feathering arms 130 to the attachment plate 140 and at a second end to the weighted end 134 of the other of the feathering arms 130. In some implementations, the tension springs 120 may comprise wires having a cross-sectional area of any size or shape (e.g., round, rectangular or square) that is tightly coiled between the fasteners 142 or other portions of one of the feathering arms 130 and the weighted ends 134 of another of the feathering arms 130. The tension spring 120 may thus expand in length, and contract in coil diameter, in response to tensile stresses created by the rotation of the feathering arms 130 about the fasteners 142.

Although the clutch mechanism 110 of FIGS. 1A through 1D includes a pair of tensioning springs 120 for biasing the respective feathering arms 130, those of ordinary skill in the pertinent arts will recognize that any number of biasing elements, and any biasing elements other than tensioning springs, may be utilized to provide a biasing force to the respective feathering arms 130 in accordance with the present disclosure, including but not limited to compression springs, extension springs, torsion springs, leaf springs, constant force springs or like elements. For example, in some embodiments, the feathering arms 130 may be leaf springs that are self-biased into closed positions about a shaft, and may be urged into an open position due to centrifugal forces acting thereon that exceed the biasing forces provided by the leaf springs.

Figure 1C:
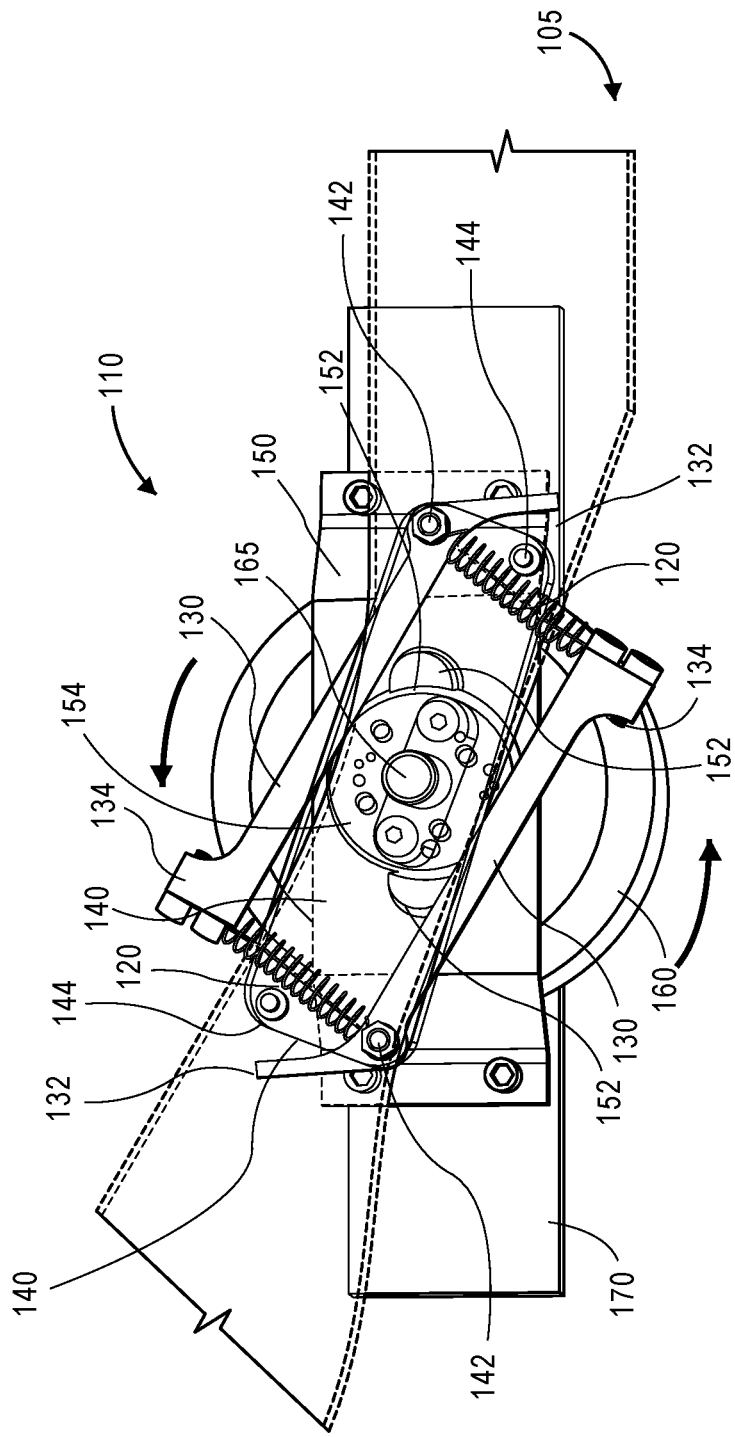
Figure 1D:
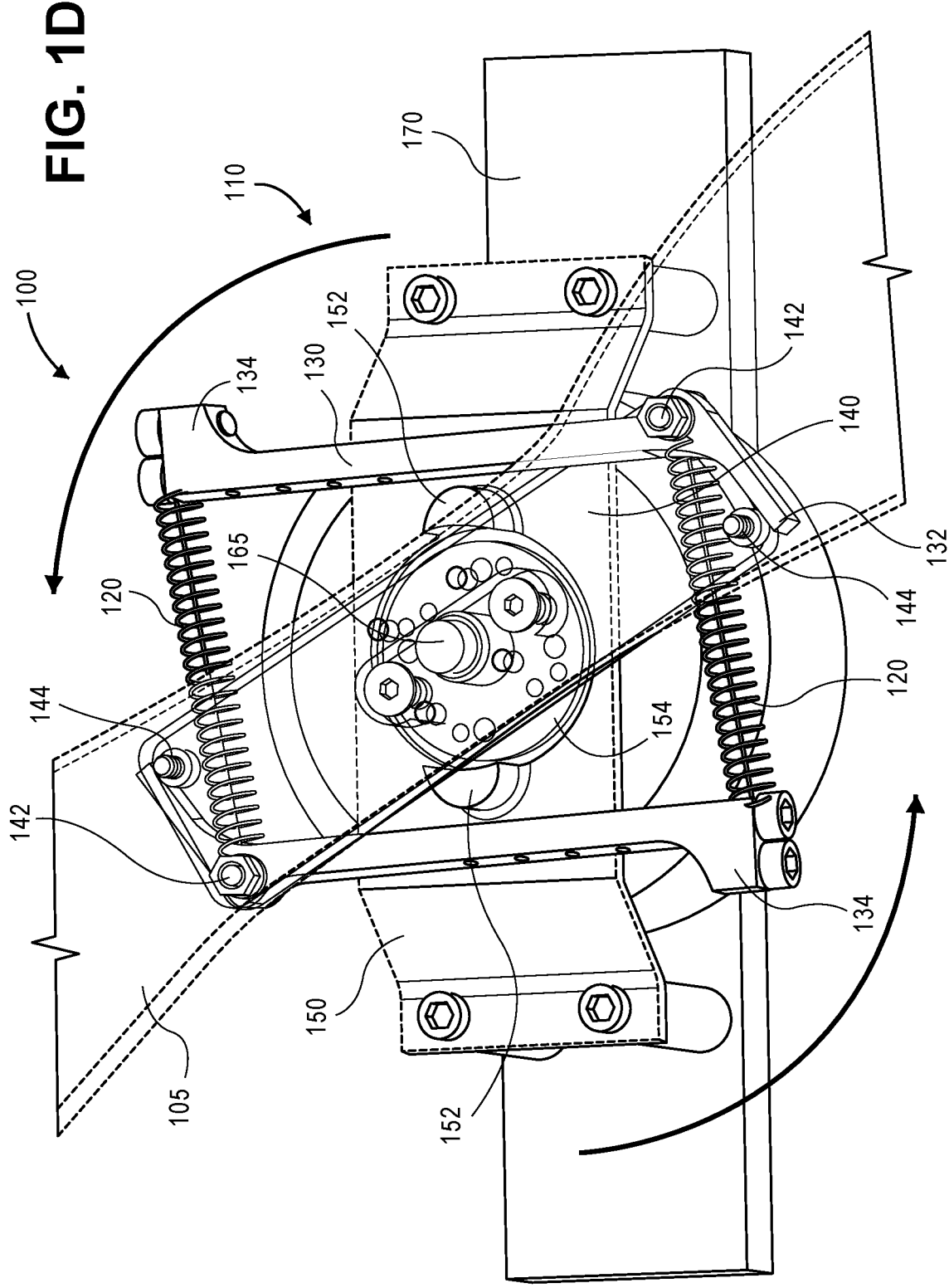

The attachment plate 140 is mounted beneath the propeller 105, and is provided to rigidly join the clutch mechanism 110 to the propeller 105, thereby ensuring that the propeller 105 and the clutch mechanism 110 rotate in tandem. As is shown in FIGS. 1B through 1D, the attachment plate 140 further includes a pair of mechanical stops 144, each of which is aligned to come into contact with one of the tapered ends 132 when one of the feathering arms 130 has rotated about an axis defined by the fastener 142 to a maximum extent, thereby resisting further rotation of the feathering arms 130. The mechanical stops 144 may include or comprise one or more posts, screws, nuts, bolts, brads or any other suitable components that may extend from the attachment plate 140 and/or the propeller 105 and be aligned to resist rotation of the feathering arms 130.

The attachment plate 140 may be joined to the propeller 105 via one or more of the fasteners 142 and/or the mechanical stops 144, which may extend through the respective feathering arms 130 and the attachment plate 140, and into the propeller 105. Alternatively, the attachment plate 140 may be joined to the propeller 105 by any other component or substance, including but not limited to one or more additional fasteners (not shown) or glues or other adhesives. In some embodiments, the clutch mechanism 110 may be joined to the propeller 105 directly, and the attachment plate 140 need not be included as a separate, discrete component.

The base 150 includes a pair of raised posts (or shoulders) 152 extending radially outward from a cylindrical platform 154 provided about an opening 155. The base 150 is mounted to the motor mount 170 by a plurality of stanchions or other supports, and extends over the motor 160. As is shown in FIGS. 1A through 1D, the posts 152 are formed on the base 150 and commonly aligned with respect to the opening 155 in order to define an axis that is substantially parallel to the motor mount 170. The shaft 165 extends between the motor 160 and the propeller 105 through the opening 155, thereby enabling the posts 152 to remain fixed in position along the axis with respect to the propeller 105.

The motor 160 is mounted to the motor mount 170 and includes a shaft 165 that extends through the opening 155 and is rigidly joined to the propeller 105. In some embodiments, the motor 160 may be a brushless direct current (DC) motor. In other embodiments, the motor 160 may be any other type or form of motor, including but not limited to one or more other electric motors, e.g., alternating current (AC) or DC powered motors, as well as any gasoline-powered motors, or motors operating based on any other power or fuel source. In some embodiments, the motor mount 170 may include all or a portion of a frame of the aerial vehicle 100, e.g., a fuselage, one or more wings, or any other component thereof, to which the base 150 and/or the motor 160 are mounted. In some embodiments, the base 150 and/or one or more of the posts 152 may be mounted directly to a non-rotating portion of the motor 160, or in any other location.

The operation of the clutch mechanism 110 is shown with regard to FIGS. 1B, 1C, and 1D. Referring to FIG. 1B, the motor 160 is stopped, and the propeller 105 is stationary. As is shown in FIG. 1B, the tension springs 120 of the clutch mechanism 110 urge the feathering arms 130 into a closed position, e.g., with the feathering arms 130 spaced narrowly apart from one another and defining a window therein, which encompasses the posts 152. Thus, when the aerial vehicle 100 is in flight, but the motor 160 is stopped, the tension springs 120 will prevent the propeller 105 from rotating in response to varying wind flows over and around the aerial vehicle, by maintaining the feathering arms 130 in the closed position shown in FIG. 1B, and the propeller 105 will remain aligned in the axis defined by the posts 152.

Referring to FIG. 1C, the propeller 105 is shown as the motor 160 is started, and the propeller 105 begins to rotate. Because the clutch mechanism 110 is joined to the propeller 105 via the attachment plate 140, the clutch mechanism 110 begins to rotate with the propeller 105, causing the posts 152 to come into contact with inner faces of each of the feathering arms 130 with each half-cycle rotation of the propeller 105. The contact between the posts 152 and the inner faces of the feathering arms 130, and centrifugal force acting on the feathering arms 130, e.g., the weighted ends 134, forces the feathering arms 130 to begin to open from the closed position of FIG. 1B as the angular velocity of the propeller 105 begins to increase.

Referring to FIG. 1D, the motor 160 is shown as causing the propeller 105 to rotate at an angular velocity above a predetermined threshold. The centrifugal force acting on the weighted ends 134 causes the feathering arms 130 to remain in a fully open position, such that the feathering arms 130 do not come into contact with either of the posts 152 as the propeller 105 is rotating. Conversely, when the motor 160 is brought to a stop, and the angular velocity of the propeller 105 begins to decrease, the feathering arms 130 are drawn inward from the fully open position of FIG. 1D due to the biasing force provided by the tension springs 120, until the feathering arms 130 begin to contact the posts 152, such as is shown in FIG. 1C. Once the propeller 105 comes to a complete stop, the feathering arms 130 are biased into the closed position shown in FIG. 1B by the tension springs 120, with the posts 152 received therein, and the propeller 105 will remain aligned along the axis defined by the posts 152.

Figure 2A:
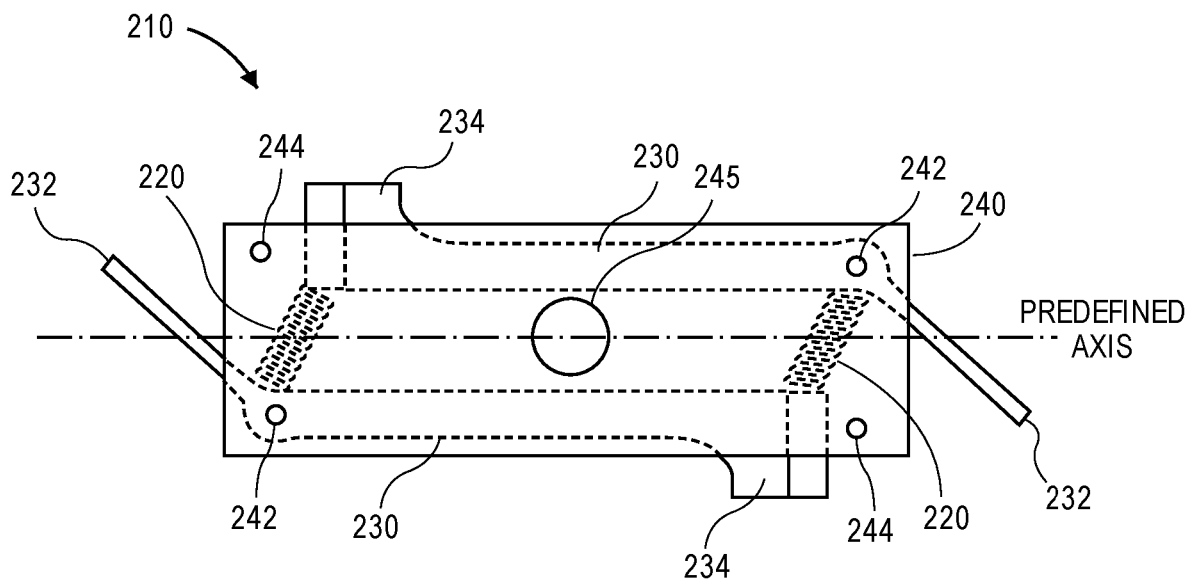
FIGS. 2A and 2B are views of aspects of a propeller clutch mechanism in accordance with embodiments of the present disclosure.
Figure 2B:
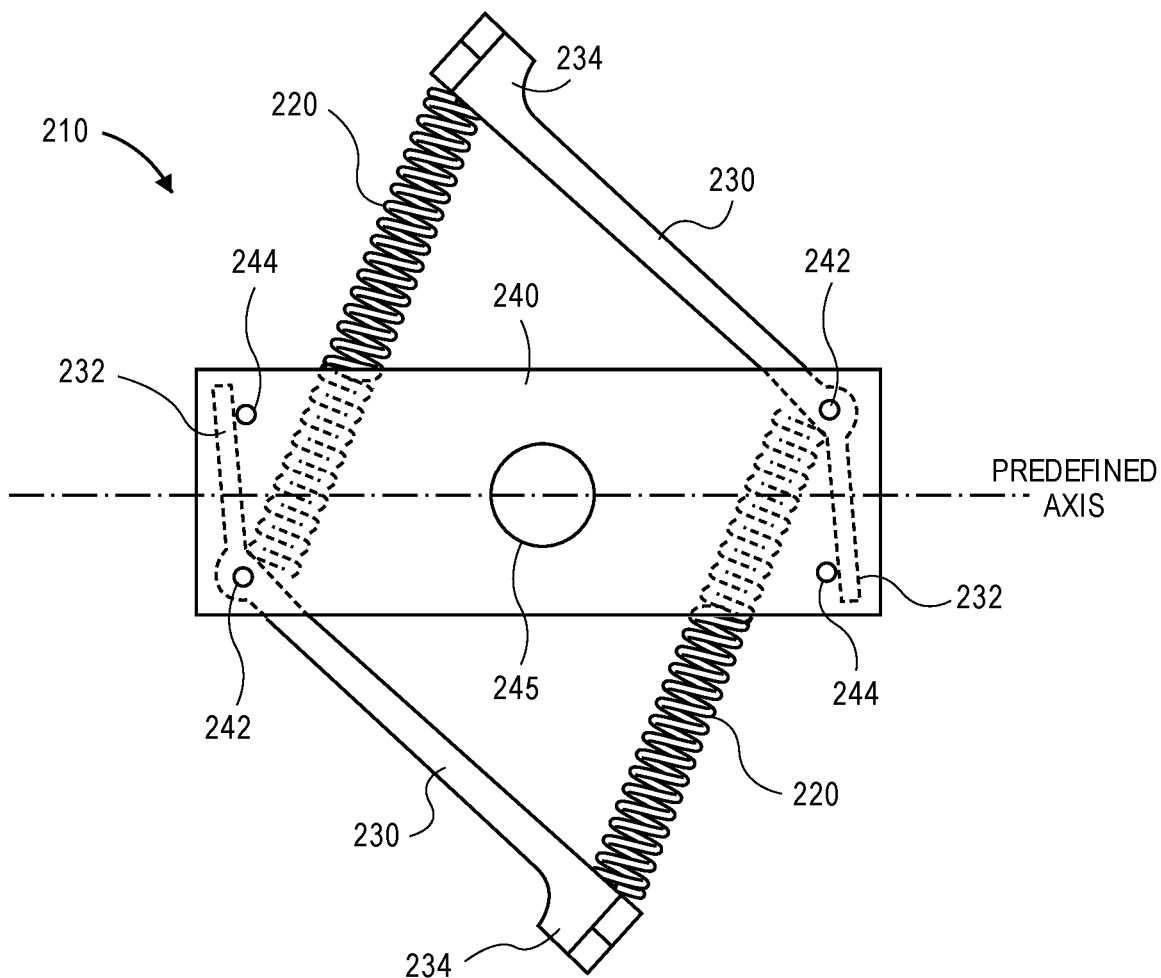

The movement of the feathering arms of one embodiment of a clutch mechanism in accordance with the present disclosure is shown in FIGS. 2A and 2B. Referring to FIGS. 2A and 2B, views of aspects of a propeller clutch mechanism 210 in accordance with embodiments of the present disclosure are shown. Except where otherwise noted, reference numerals preceded by the number "2" shown in FIG. 2A or FIG. 2B indicate components or features that are similar to components or features having reference numerals preceded by the number "1" shown in FIGS. 1A through 1D.

As is shown in FIGS. 2A and 2B, the clutch mechanism 210 includes a pair of tension springs 220 and a pair of feathering arms 230 rotatably or pivotably mounted to an attachment plate 240 by fasteners 242. Each of the feathering arms 230 includes a tapered end 232 and a weighted end 234. The attachment plate 240 further includes a pair of mechanical stops 244, each of which is aligned to stop the rotation of the feathering arms 230, and an opening 245 adapted to receive a shaft (not shown) therein. Each of the tension springs 220 is connected at a first end to the fastener 242 that mounts one of the feathering arms 230 to the attachment plate 240 and at a second end to the weighted end 234 of another of the feathering arms 230.

As is shown in FIG. 2A, the feathering arms 230 are in a closed position, e.g., wherein a propeller (not shown) to which the attachment plate 240 is mounted is stationary, and the tension springs 220 bias the feathering arms 230 toward one another, and around a shaft of the propeller. When the feathering arms 230 are in the closed position of FIG. 2A, a window for encompassing one or more posts (not shown) that are aligned along a predefined axis is defined between the feathering arms 230, such that the propeller remains aligned along the predefined axis until a motor causes the propeller to rotate when the one or more posts are received therein.

As is shown in FIG. 2B, the feathering arms 230 are in a fully open position, e.g., wherein a propeller (not shown) to which the attachment plate 240 is mounted rotates at a sufficient angular velocity, such that centrifugal forces acting on the weighted ends 234 of the feathering arms 230 exceed the biasing forces applied to the feathering arms 230 by the tensioning springs 220. When the feathering arms 230 are in the fully open position of FIG. 2B, the feathering arms 230 are sufficiently separated, such that the feathering arms 230 rotate freely of the one or more posts (not shown) between the feathering arms 230, and the tapered ends 232 of the feathering arms 230 come into contact with the corresponding mechanical stops 244.

Figure 3A:
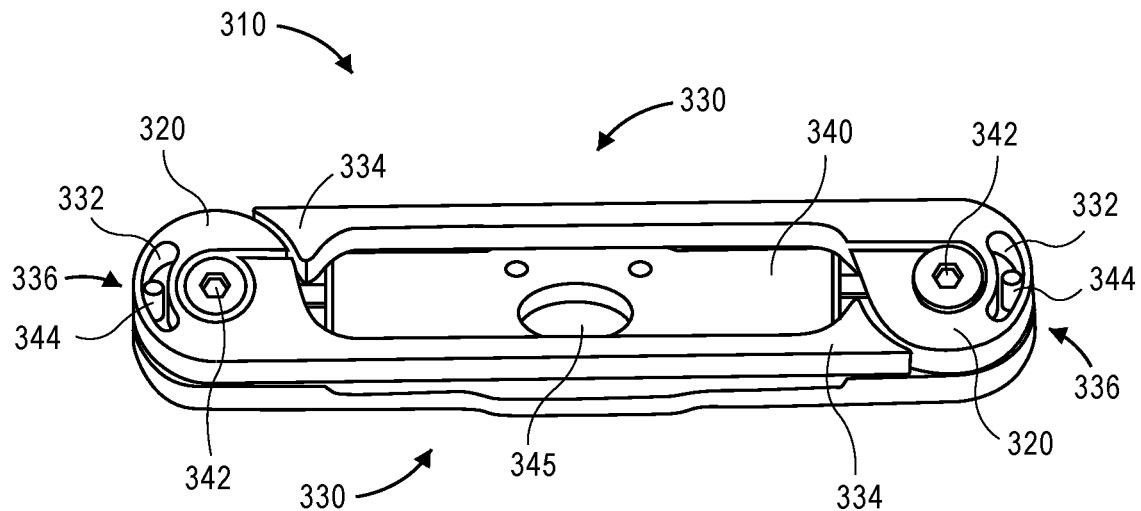
FIGS. 3A and 3B are views of aspects of a propeller clutch mechanism in accordance with embodiments of the present disclosure.
Figure 3B:
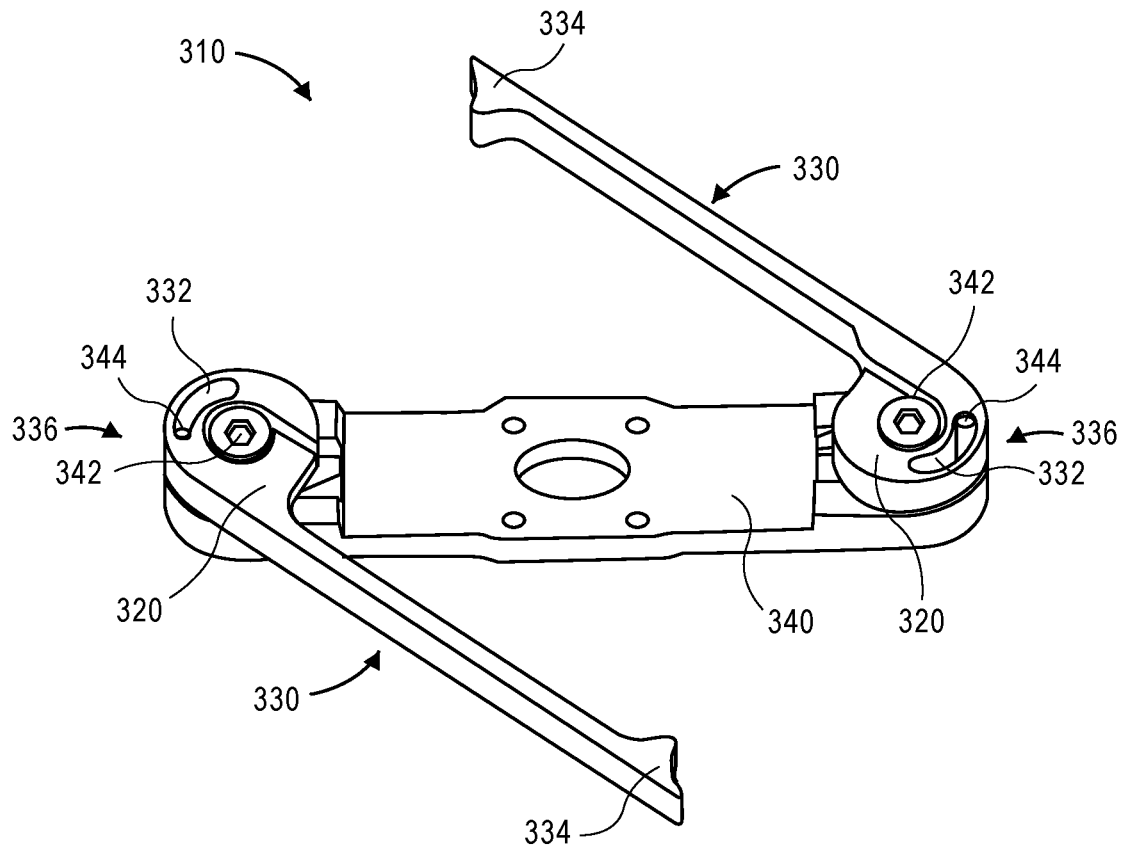

Those of ordinary skill in the pertinent arts will recognize that the components of the clutch mechanisms of the present disclosure may take any shape or form, and are not limited to the orientations or shapes of the components of the clutch mechanism 210 shown in FIGS. 2A and 2B. For example, springs or other elements for providing biasing forces to feathering arms and mechanical stops for inhibiting rotation of the feathering arms may be provided as separate or discrete components of the feathering arms or, alternatively, integral to or within such feathering arms. Referring to FIGS. 3A and 3B, views of aspects of a propeller clutch mechanism 310 in accordance with embodiments of the present disclosure are shown. Except where otherwise noted, reference numerals preceded by the number "3" shown in FIG. 3A or FIG. 3B indicate components or features that are similar to components or features having reference numerals preceded by the number "2" shown in FIGS. 2A and 2B or by the number "1" shown in FIGS. 1A through 1D.

As is shown in FIGS. 3A and 3B, the clutch mechanism 310 includes a pair of feathering arms 330 rotatably or pivotably mounted to an attachment plate 340 via fasteners 342. Each of the feathering arms 330 includes a torsion spring 320 embedded within a rotatable canister-type housing 336 mounted about one of the fasteners 342. Each of the feathering arms 330 further includes a slot 332 provided within and extending through the housing 336 and a weighted end 334. The attachment plate 340 further includes a pair of mechanical stops 344 in the form of pegs or posts. As is shown in FIGS. 3A and 3B, one of the mechanical stops 344 is extended into each of the slots 332. As is also shown in FIGS. 3A and 3B, each of the weighted ends 334 of the feathering arms 330 has a rounded (e.g., concave)

surface that conforms to a rounded (e.g., convex) surface of the housing 336 of another of the feathering arms 330.

As is shown in FIG. 3A, the feathering arms 330 are in a closed position, e.g., wherein a propeller (not shown) to which the attachment plate 340 is mounted is stationary, and the torsion springs 320 bias the feathering arms 330 toward one another, and around a shaft of the propeller. When the feathering arms 330 are in the closed position of FIG. 3A, one or more posts (not shown) that are aligned along a predefined axis may be received between the feathering arms 330, such that the propeller remains aligned along the predefined axis until a motor causes the propeller to rotate. When the feathering arms 330 are in the closed position of FIG. 3A, a window for encompassing one or more posts (not shown) that are aligned along a predefined axis is defined in between the feathering arms 330, and the rounded surfaces of the weighted ends 334 and the housings 336 of opposing arms smoothly mate with one another.

As is shown in FIG. 3B, the feathering arms 330 are in a fully open position, e.g., wherein a propeller (not shown) to which the attachment plate 340 is mounted rotates at a sufficient angular velocity, such that centrifugal forces acting on the weighted ends 334 of the feathering arms 330 exceed the biasing forces applied to the feathering arms 330 by the tensioning springs 320. When the feathering arms 330 are in the fully open position of FIG. 3B, the feathering arms 330 are sufficiently separated, such that the feathering arms 330 rotate freely of the one or more posts (not shown) between the feathering arms 330.

As is shown in FIGS. 3A and 3B, the rotation of the feathering arms 330 of the clutch mechanism 310 is limited by the extent to which the mechanical stops 344 may rotate within the slots 332, which have arcuate shapes corresponding to the shapes of the housings 336. For example, each of the feathering arms 330 may rotate between the closed position of FIG. 3A and the open position of FIG. 3B, each of which is defined by the extent and length of the corresponding slots 332 within the respective feathering arms 330. Rotation of the feathering arms 330 beyond the open position of FIG. 3A or the closed position of FIG. 3B is inhibited by contact between the mechanical stops 344 and internal surfaces of the slots 332.

As is discussed above, the clutch mechanisms of the present disclosure may include any type or form of feathering arm (or locking arm) provided in a rotatable or pivotable manner that may defining a window or opening for accommodating posts or shoulders that are aligned along a predefined axis when the feathering arms are in a closed position, and for permitting a propeller to rotate free of contact with such posts when the feathering arms are in a closed position. Those of ordinary skill in the pertinent arts will recognize that the clutch mechanisms of the present disclosure are not limited to the feathering arms 230 of FIG. 2A or 2B, or the feathering arms 330 of FIGS. 3A and 3B, or any particular arrangement or orientation thereof.

As is discussed above, one or more posts may be provided in a predetermined alignment such that when the posts are received between feathering arms of a clutch mechanism of the present disclosure, and a propeller to which the clutch mechanism is joined falls below a predetermined threshold angular velocity, the feathering arms are biased to positions surrounding the posts, and the propeller comes to a stop in an orientation consistent with the predetermined alignment of the posts. Referring to FIG. 4, a view of aspects of a propeller clutch mechanism in accordance with embodiments of the present disclosure is shown. Except where otherwise noted, reference numerals preceded by the number "4" shown in FIG. 4 indicate components or features that are similar to components or features having reference numerals preceded by the number "3" shown in FIGS. 3A and 3B, by the number "2" shown in FIGS. 2A and 2B or by the number "1" shown in FIGS. 1A through 1D.

As is shown in FIG. 4, a base 450 includes a pair of raised posts 452 extending radially outward from a cylindrical platform 454 provided about an opening 455. The base 450 is mounted to the motor mount 470 by a plurality of stanchions 456 or other supports. As is discussed above, the base 450 is formed in a substantially trapezoidal shape, and may be mounted above a motor (not shown) in a manner that enables a shaft (not shown) of the motor to extend between the motor and a propeller (not shown) through the opening 455, thereby enabling the posts 452 to remain fixed in position with respect to the propeller.

As is also shown in FIG. 4, the posts 452 are formed on the base 450 and commonly aligned with the opening 455 to define an axis. Thus, in some embodiments, when the base 450 of FIG. 4 is provided in an aerial vehicle (not shown) having a propeller mounted to a shaft (or other propeller mounting structure) extending through the opening 455, and the propeller is stationary, the posts 452 may be received within or between feathering arms of a clutch mechanism (not shown) joined to the propeller that are in a closed position, such that the propeller remains in an orientation consistent with the axis defined by the posts 452.

The clutch mechanisms of the present disclosure may be configured to cause a stationary propeller to remain aligned in any orientation or along any axis, and such orientations or axes may be selected on any basis. For example, referring again to FIG. 4, the posts 452 of the base 450 may be aligned in a selected axis that is consistent with or parallel to a direction of travel of an aerial vehicle, such that a stationary propeller having a clutch mechanism of the present disclosure is biased into an alignment along the axis. In this regard, the clutch mechanisms of the present disclosure may be used to reduce the drag of an aerial vehicle operating in a thrust mode, e.g., where fewer than all of the propellers provided on the aerial vehicle are required for lift, by aligning propellers that are not required in order to operate in the thrust mode in a direction of travel, thereby reducing drag associated with allowing such propellers to rotate freely. The clutch mechanisms of the present disclosure operate based on biasing forces provided by springs or other biasing elements, and centrifugal forces generated by a rotating propeller, thereby enabling a propeller to be placed in a predetermined alignment without any electrical or powered mechanical components.

Figure 5:
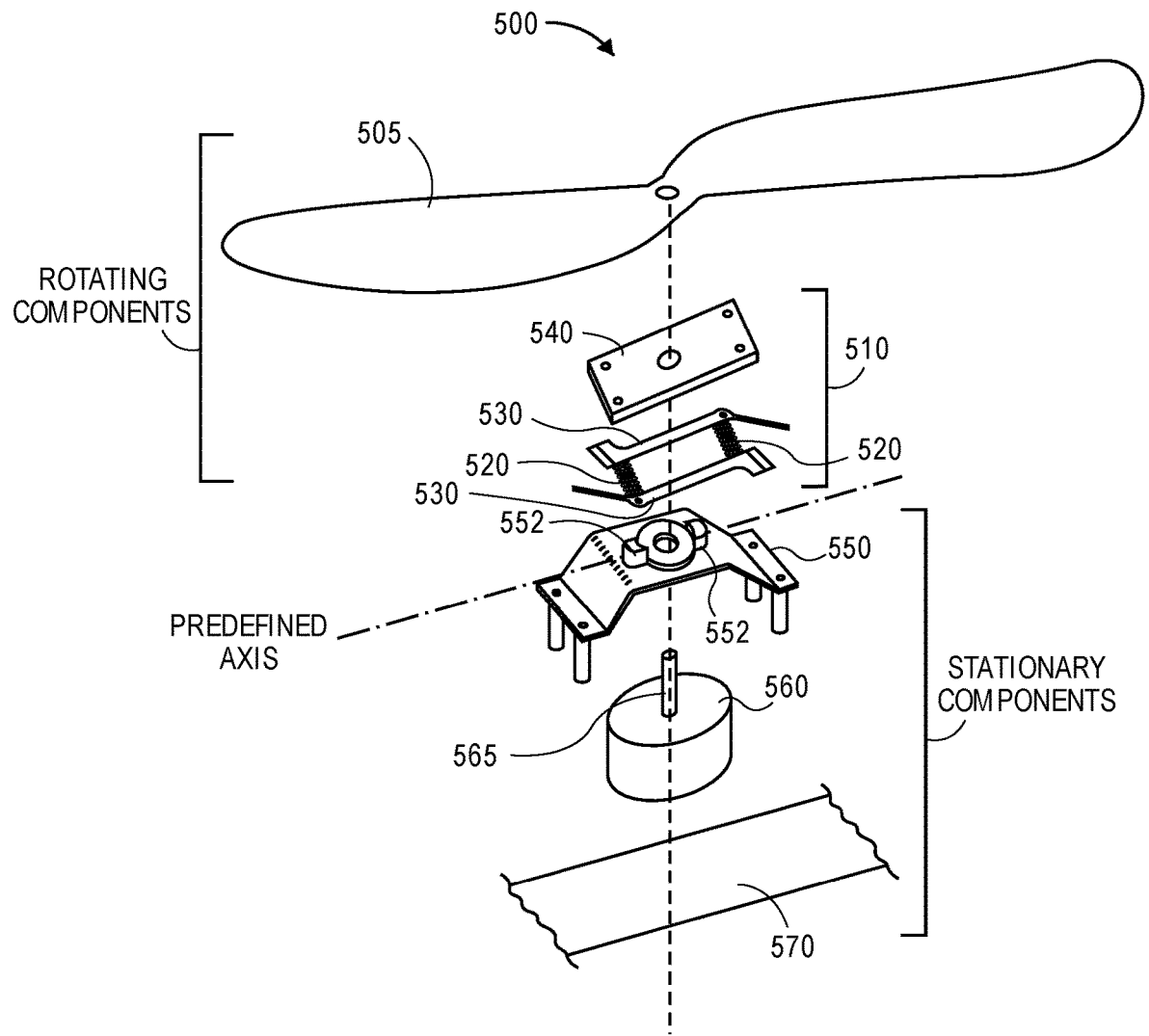
FIG. 5 is an exploded view of aspects of an aerial vehicle including a propeller clutch mechanism in accordance with embodiments of the present disclosure.

As is discussed above, the clutch mechanisms of the present disclosure are rotatable components mounted to or otherwise associated with propellers and are configured to receive one or more stationary components, e.g., posts or shoulders provided on a base or other structural feature, therein. Spatial relationships of the various components of an aerial vehicle including one of the clutch mechanisms of the present disclosure are shown in FIG. e5. Referring to FIG. 5, an exploded view of aspects of an aerial vehicle 500 including a propeller clutch mechanism 510 in accordance with embodiments of the present disclosure is shown. Except where otherwise noted, reference numerals preceded by the number "5" shown in FIG. 5 indicate components or features that are similar to components or features having reference numerals preceded by the number "4" shown in FIG. 4, by the number "3" shown in FIGS. 3A and 3B, by the number "2" shown in FIGS. 2A and 2B or by the number "1" shown in FIGS. 1A through 1D.

As is shown in FIG. 5, the aerial vehicle 500 includes a propeller 505, a clutch mechanism 510, a base 550, and a motor 560. The propeller 505 is rigidly joined to the motor 560 by a shaft 565, which may cause the propeller 505 to rotate in response to a rotating motive force provided by the motor 560. The clutch mechanism 510 is mounted to an underside of the propeller 505 by an attachment plate 540, and includes a pair of tension springs 520 and a pair of feathering arms 530. The base 550 is mounted to a motor mount 570 above the motor 560, e.g., by one or more stanchions, and includes a pair of raised posts 552 extending upwardly above the base 550 and into an opening defined by the pair of feathering arms 530. As is shown in FIG. 5, the posts 552 are formed on the base 550 and define an axis that is substantially parallel to the motor mount 570. The shaft 570 extends between the motor 560 and the propeller 505 through the opening 555, thereby enabling the posts 552 to remain fixed in position with respect to the propeller 505.

Therefore, as is shown in FIG. 5, the aerial vehicle 500 includes a plurality of rotatable components, including but not limited to the propeller 505 and the clutch mechanism 510, which may be caused to rotate by the motor 560, and a plurality of stationary components, including but not limited to the base 550, the motor 560 and the motor mount 570, which remain fixed in position without regard to the rotation or position of the propeller 505 or the clutch mechanism 510. One or more of the stationary components, e.g., the posts 552 provided on the base 550, may extend into a window or other opening defined by the feathering arms 530 of the clutch mechanism 510, which are biased into a closed position by the tension springs 520. When the motor 560 is stopped, an angle of orientation of the rotatable components may be defined by the stationary components, e.g., the posts 552, extending into the window or opening of the rotatable clutch mechanism 510. When the motor 560 is started, however, the propeller 505 and the clutch mechanism 510 begin to rotate, and centrifugal forces cause the feathering arms 530 to open around the posts 552.

Figure 6A:
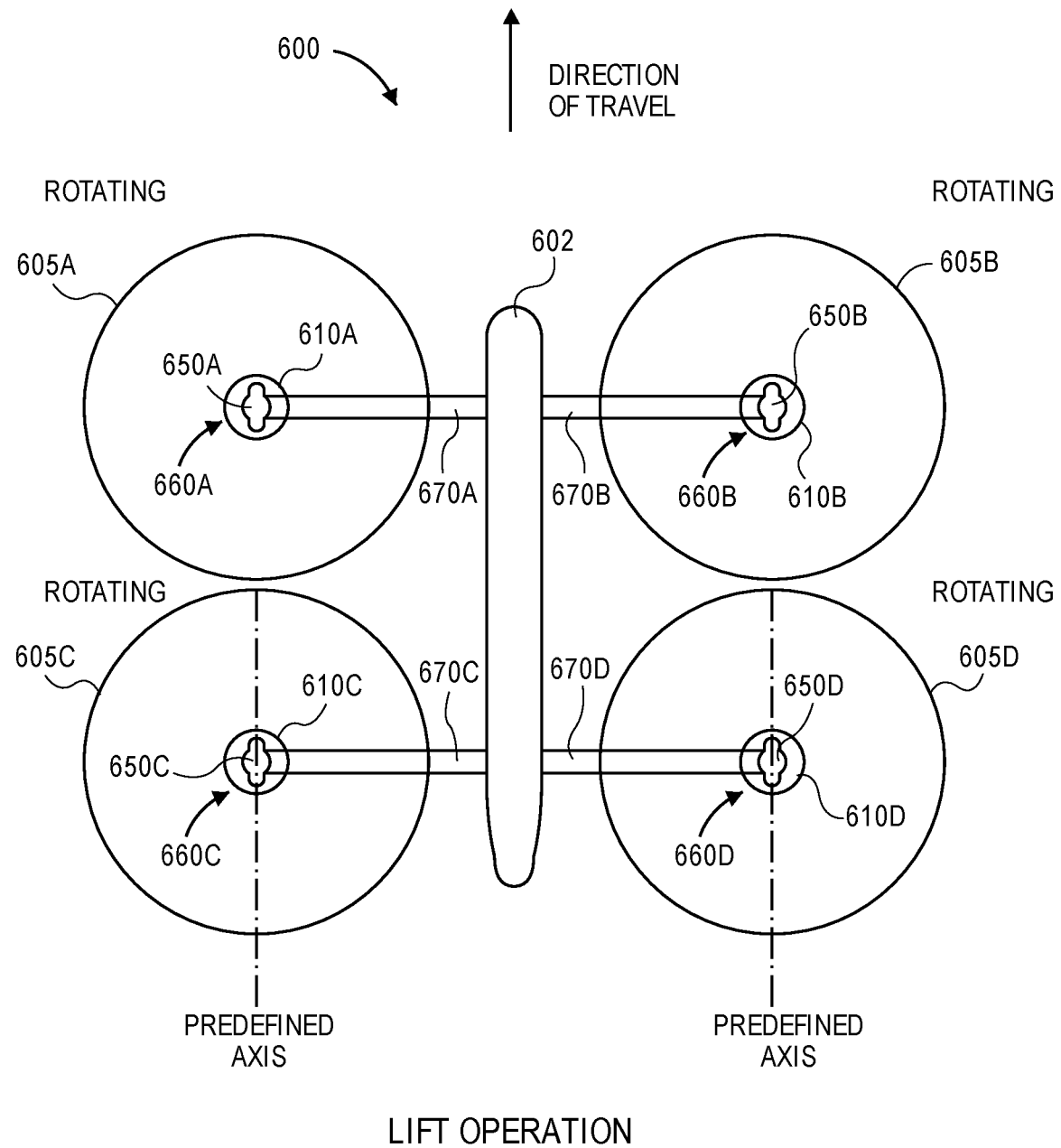
FIGS. 6A and 6B are views of aspects of an aerial vehicle including a plurality of propeller clutch mechanisms in accordance with embodiments of the present disclosure.
Figure 6B:
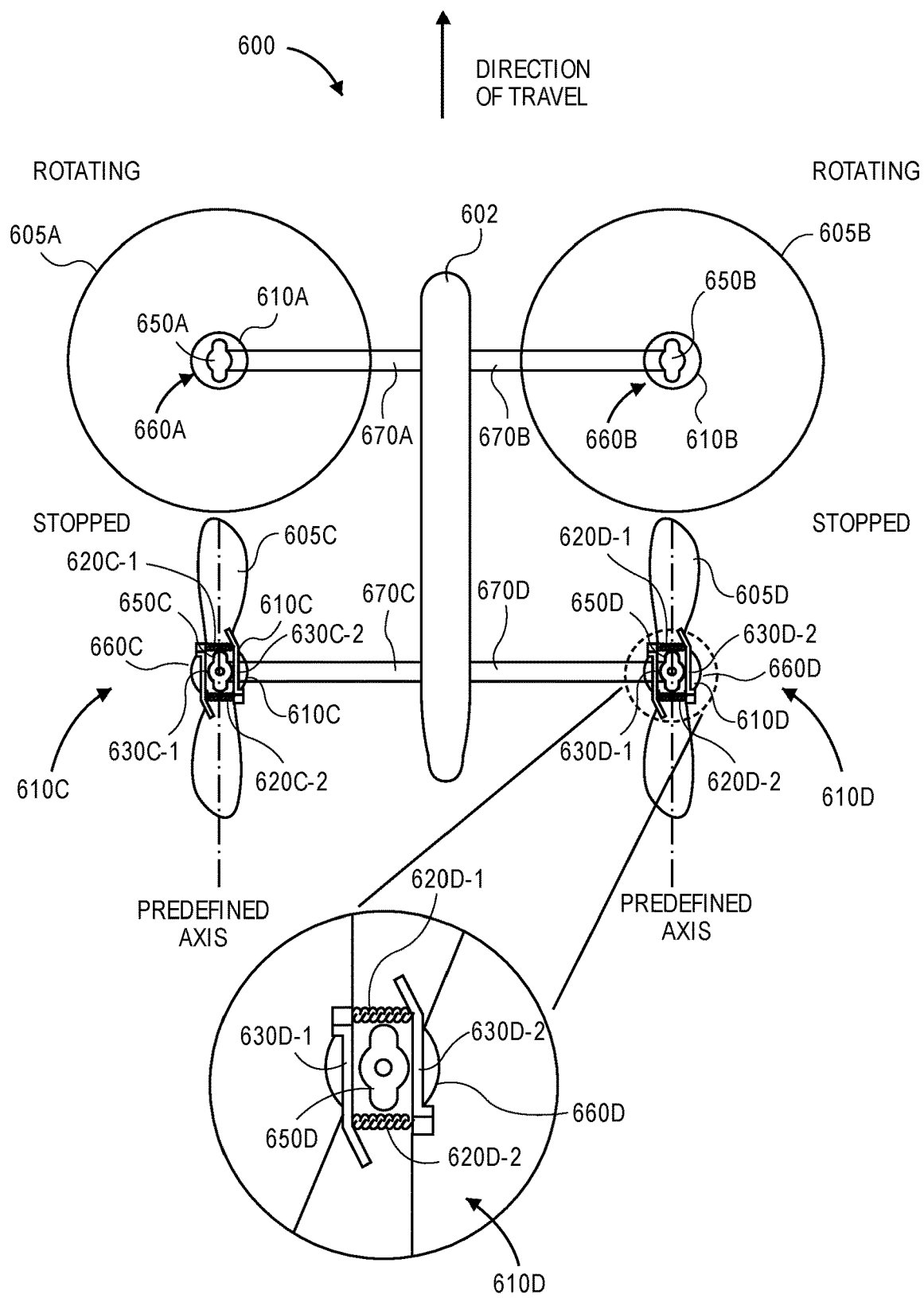

As is discussed above, the systems and methods of the present disclosure may be utilized to place a propeller in a preferred alignment when rotation of the propeller is neither desired nor required. The alignment of the propeller may be selected on any basis, including but not limited to drag, acoustic or other operational considerations. For example, a clutch mechanism may be used to cause a propeller to align in a direction of travel of an aerial vehicle when the propeller is not operating. Referring to FIGS. 6A and 6B, views of aspects of an aerial vehicle 600 including a plurality of propeller clutch mechanisms 610A, 610B, 610C, 610D in accordance with embodiments of the present disclosure are shown. Except where otherwise noted, reference numerals preceded by the number "6" shown in FIG. 6A or FIG. 6B indicate components or features that are similar to components or features having reference numerals preceded by the number "5" shown in FIG. 5, by the number "4" shown in FIG. 4, by the number "3" shown in FIGS. 3A and 3B, by the number "2" shown in FIGS. 2A and 2B or by the number "1" shown in FIGS. 1A through 1D.

As is shown in FIGS. 6A and 6B, the aerial vehicle 600 includes a fuselage 602, four propellers 605A, 605B, 605C, 605D, four clutch mechanisms 610A, 610B, 610C, 610D and four motors 660A, 660B, 660C, 660D. The propellers 605A, 605B, 605C, 605D, the clutch mechanisms 610A, 610B, 610C, 610D and the motors 610A, 610B, 610C, 610D are joined to the fuselage 602 by mounts 670A, 670B, 670C, 670D.

Referring to FIG. 6A, the aerial vehicle 600 is shown during lift operations, e.g., where each of the propellers 605A, 605B, 605C, 605D and the clutch mechanisms 610A, 610B, 610C, 610D are rotated by the motors 660A, 660B, 660C, 660D. When the motors 660A, 660B, 660C, 660D cause the propellers 605A, 605B, 605C, 605D to rotate at a sufficiently high angular velocity, the clutch mechanisms 610A, 610B, 610C, 610D are in a fully open position, and the rotation of the propellers 605A, 605B, 605C, 605D occurs in an unimpeded fashion during the lift operations shown in FIG. 6A.

Referring to FIG. 6B, the aerial vehicle 600 is shown during thrust operations, e.g., where only the propellers 605A, 605B and the clutch mechanisms 610A, 610B are rotated by the motors 660A, 660B, and where the motors 660C, 660D are stopped. Thus, while the rotation of the propellers 605A, 605B occurs in an unimpeded fashion, without contact between the clutch mechanisms 610A, 610B and the bases 650A, 650B, the propellers 605C, 605D are aligned along axes defined by the bases 650C, 650D, e.g., by one or more posts or shoulders extending upwardly and into windows or openings defined by the clutch mechanisms 610A, 610B. More specifically, as is shown with regard to the clutch mechanism 610D of FIG. 6B, feathering arms 630D-1, 630-D-2 are biased into a closed position around the base 650D by the tension springs 620D-1, 620D-2. Thus, because the bases 650C, 650D define axes that are parallel to or consistent with the direction of travel, the propellers 605C, 605D aligned along such axes, thereby reducing or minimizing drag or other adverse acoustic conditions that may result if the propellers 605C, 605D were permitted to drift or freely rotate during thrust operations of the aerial vehicle 600.

Figure 7A:
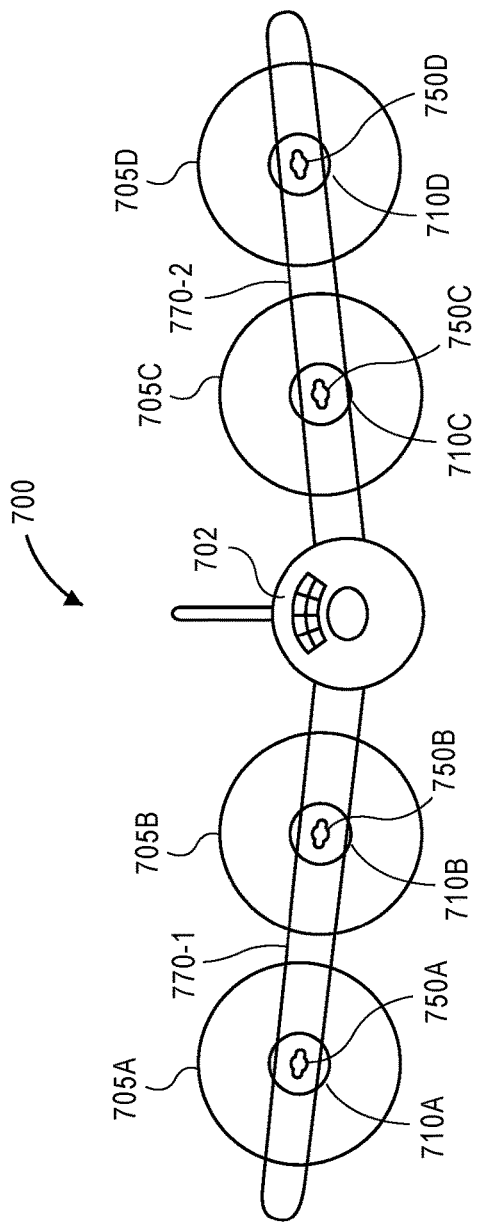
FIGS. 7A and 7B are views of aspects of an aerial vehicle including a plurality of propeller clutch mechanisms in accordance with embodiments of the present disclosure.
Figure 7B:
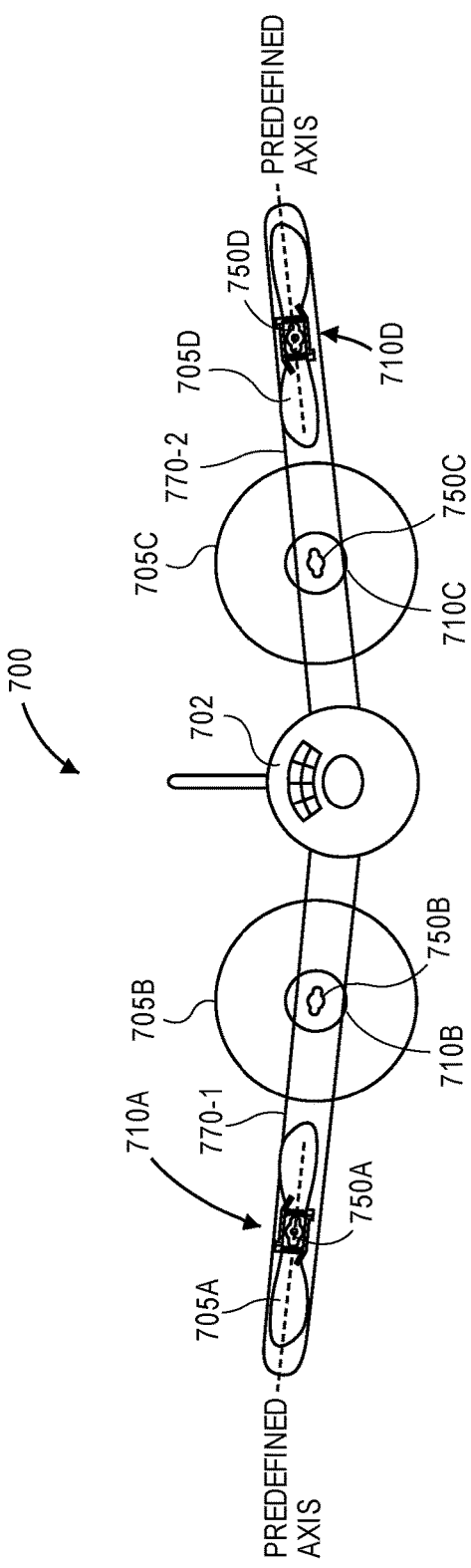

An axis along which a propeller may be aligned when the rotation of the propeller is no longer desired may be defined or selected on any basis using one or more of the clutch mechanisms of the present disclosure. Additionally, the clutch mechanisms of the present disclosure are not limited for use in helicopter-type aerial vehicles, or unmanned aerial vehicles. Referring to FIGS. 7A and 7B, views of aspects of an aerial vehicle 700 including a propeller clutch mechanism 710 in accordance with embodiments of the present disclosure are shown. Except where otherwise noted, reference numerals preceded by the number "7" shown in FIG. 7A or FIG. 7B indicate components or features that are similar to components or features having reference numerals preceded by the number "6" shown in FIG. 6A or FIG. 6B, by the number "5" shown in FIG. 5, by the number "4" shown in FIG. 4, by the number "3" shown in FIGS. 3A and 3B, by the number "2" shown in FIGS. 2A and 2B or by the number "1" shown in FIGS. 1A through 1D.

As is shown in FIGS. 7A and 7B, the aerial vehicle 700 is a fixed-wing aircraft having a fuselage 702, a pair of wings 770-1, 770-2 and four propellers 705A, 705B, 705C, 705D that may be caused to rotate about shafts driven by one or more motors (not shown) mounted to the wings 770-1, 770-2. Each of the propellers 705A, 705B, 705C, 705D may have a clutch mechanism 710A, 710B, 710C, 710D configured to rotate about bases 750A, 750B, 750C, 750D that are aligned along predefined axes corresponding to the wings 770-1, 770-2. Thus, when each of the propellers 705A, 705B, 705C, 705D are required for operation of the aerial vehicle 700, e.g., in a high-speed or maximum-power evolution, such as is shown in FIG. 7A, each of the clutch mechanisms 710A, 710B, 710C, 710D are in a fully open position, and the propellers 705A, 705B, 705C, 705D may rotate about the bases 750A, 750B, 750C, 750D in an unimpeded fashion.

When the operation of one or more of the propellers 705A, 705B, 705C, 705D is neither desired nor required, however, the motors coupled to such propellers 705A, 705B, 705C, 705D may be stopped, and the rotation of the corresponding propellers 705A, 705B, 705C, 705D is permitted to slow to below a threshold angular velocity. When an angular velocity of one or more of the propellers 705A, 705B, 705C, 705D falls below the threshold, the clutch mechanisms 710A, 710B, 710C, 710D of such propellers 705A, 705B, 705C, 705D contract around their respective shafts and cause such propellers 705A, 705B, 705C, 705D to be aligned along axes defined by their respective bases 750A, 750B, 750C, 750D. For example, referring to FIG. 7B, motors corresponding to propellers 705A, 705D are stopped, and the clutch mechanisms 710A, 710B mounted to propellers 705A, 705B cause the propellers 705A, 705D to remain fixed in alignment along axes defined by the bases 750A, 750D, e.g., corresponding to the angles of orientation of the respective wings 770-1, 770-2.

Those of ordinary skill in the pertinent arts will recognize that the clutch mechanisms of the present disclosure may be utilized to align propellers along a predefined axis in any manner, on any basis, and for any purpose. For example, referring again to FIG. 7B, the bases 750A, 750D may be aligned in an axis substantially perpendicular to the respective wings 770-1, 770-2, so as to minimize any reductions in lift caused by drag due to the non-rotating propellers 705A, 705D, to enable easier access to motors (not shown) to which such propellers 705A, 705D are mounted during maintenance evolutions, or for any other purpose.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, those of ordinary skill in the pertinent arts will recognize that the clutch mechanisms of the present disclosure are not limited to combinations of two feathering arms (or locking arms) and two tension members. Some embodiments of clutch mechanisms provided in association with propellers may include a single feathering arm, e.g., a crescent-shaped feathering arm, having a single tensioning member that enables the single feathering arm to rotate or pivot away from one or more stationary posts or shoulders provided on a base at sufficiently high angular velocities yet causes the single feathering arm to contract around such posts or shoulders at sufficiently low angular velocities, or when a propeller is no longer rotating. Other embodiments of clutch mechanisms of the present disclosure may include three or more feathering arms, each of which may be configured to rotate or pivot away from posts or shoulders, or contract around such posts or shoulders, depending on an angular velocity of a propeller with which such clutch mechanisms are associated. For example, the three or more feathering arms may define a polygonal or continuous shape (e.g., an equilateral triangle or a circle) when such arms are in a closed position, and may contract around one or more stationary posts or shoulders that are arranged in a similar or corresponding shape. Furthermore, tensioning members for biasing such arms may be mounted to any portion of a propeller, an attachment plate, or other rotating component in accordance with the present disclosure.

Furthermore, those of ordinary skill in the pertinent arts will also recognize that the clutch mechanisms disclosed herein may be utilized in connection with propellers having any number of blades, and are not limited to two-bladed propellers. Such propellers may be caused to align along a predefined axis selected on any basis. Additionally, the clutch mechanisms of the present disclosure are also not limited for use on aerial vehicles. For example, a clutch mechanism may be mounted in association with a propeller on a seagoing vessel, and may cause the propeller to align in a preferred orientation, e.g., co-aligned with a rudder or other appurtenance, when rotation of the propeller is no longer desired, thereby reducing not only drag or other adverse flow effects but also a risk of damage to the propeller during slow or abnormal operations, e.g., departing from port, returning to port, or entering a dry-dock. Moreover, the clutch mechanisms may be utilized in connection with one or more other systems for managing flow conditions or reducing drag or acoustic effects caused thereby.

Furthermore, although some of the embodiments disclosed herein reference the use of unmanned aerial vehicles, those of ordinary skill in the pertinent arts will recognize that uses of one or more of the clutch mechanisms disclosed herein are not so limited, and may be utilized in connection with any type or form of aerial vehicle (e.g., manned or unmanned) for which the rotation of a propeller may be desired on a temporary basis, or for less than an entire duration of flight or related operations.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, orders in which such methods or processes are presented are not intended to be construed as any limitation on the claimed inventions, and any number of the method or process steps or boxes described herein can be combined in any order and/or in parallel to implement the methods or processes described herein. Further, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An unmanned aerial vehicle comprising:
a frame;
a base mounted to the frame, wherein the base comprises a platform having an opening, a first post extending perpendicular from the platform and a second post extending perpendicular from the platform;
a motor mounted to the frame beneath the base, wherein the motor comprises a shaft extending through the opening of the platform;
a propeller mounted to a distal end of the shaft, wherein the propeller has a first side facing toward the platform and a second side facing away from the platform, and wherein the first post and the second post extend perpendicular from the platform toward the first side of the propeller; and
a clutch mechanism mounted to the first side of the propeller, wherein the clutch mechanism further comprises:
a first feathering arm pivotably mounted to the first side of the propeller by a first fastener, wherein the first feathering arm is adapted to pivot about the first fastener between a first position proximate the first post and the second post and a second position remote from the first post and the second post;
a second feathering arm pivotably mounted to the first side of the propeller by a second fastener, wherein the second feathering arm is adapted to pivot about the second fastener between a third position proximate the first post and the second post and a fourth position remote from the first post and the second post;
a first biasing element mounted to the first side of the propeller, wherein the first biasing element is configured to apply a first biasing force urging the first feathering arm to at least a first portion of the first feathering arm, and wherein the first biasing force urges the first feathering arm into the first position; and
a second biasing element mounted to the first side of the propeller, wherein the second biasing element is configured to apply a second biasing force urging the second feathering arm to at least a second portion of the second feathering arm, and wherein the second biasing force urges the second feathering arm into the third position,
wherein the first feathering arm is configured to pivot into the second position when an angular velocity of the propeller exceeds a first predetermined threshold, and
wherein the second feathering arm is configured to pivot into the fourth position when the angular velocity of the propeller exceeds the first predetermined threshold.

2. The unmanned aerial vehicle of claim 1,
wherein the clutch mechanism is aligned along the axis defined by the first post and the second post when the first feathering arm is in the first position and when the second feathering arm is in the third position.

3. The unmanned aerial vehicle of claim 1,
wherein at least one of the first feathering arm or the second feathering arm is aligned to contact at least one of the first post or the second post when the first feathering arm is in the first position or when the second feathering arm is in the third position, and
wherein neither the first feathering arm nor the second feathering arm is aligned to contact either of the first post or the second post when the first feathering arm is in the second position or when the second feathering arm is in the fourth position.

4. The unmanned aerial vehicle of claim 1, wherein the first feathering arm comprises a first weighted end and a first tapered end provided at an obtuse angle with respect to the first weighted end, and
wherein the second feathering arm comprises a second weighted end and a second tapered end provided at the obtuse angle with respect to the second weighted end.

5. The unmanned aerial vehicle of claim 4, wherein the first biasing element is a first tension spring mounted to the first weighted end and the second fastener, and
wherein the second biasing element is a second tension spring mounted to the second weighted end and the first fastener.

6. A propeller coupled to a shaft, wherein the propeller comprises:
a clutch mechanism mounted to a first surface of the propeller,
wherein the clutch mechanism further comprises:
at least one arm pivotably mounted to the first surface of the propeller, wherein the at least one arm is configured to pivot within a plane perpendicular to an axis of rotation of the shaft between a first position proximate the shaft and a second position remote from the shaft; and
at least one biasing element applying a biasing force urging the at least one arm into the first position,
wherein the at least one arm is configured to contact at least one post extending in parallel with the shaft when the at least one arm is in the first position,
wherein the clutch mechanism inhibits rotation of the propeller about the axis of rotation with the at least one arm in the first position, and
wherein the clutch mechanism does not inhibit rotation of the propeller with the at least one arm in the second position.

7. The propeller of claim 6,
wherein the at least one arm comprises a weighted end and a tapered end provided at an obtuse angle with respect to the weighted end, and
wherein a first mass of the weighted end exceeds a second mass of the tapered end.

8. The propeller of claim 7, wherein the at least one biasing element applies the biasing force to the weighted end.

9. The propeller of claim 8, wherein a centrifugal force on the weighted end exceeds the biasing force when an angular velocity of the propeller exceeds a predetermined threshold, and
wherein the at least one arm pivots from the first position to the second position when the centrifugal force on the weighted end exceeds the biasing force.

10. The propeller of claim 7,
wherein the clutch mechanism is configured to rotate without contacting the at least one post when the at least one arm is in the second position.

11. The propeller of claim 6, further comprising an attachment plate joined to the first surface of the propeller,
wherein the at least one arm is pivotably mounted to the attachment plate.

12. The propeller of claim 11, further comprising a mechanical stop mounted to the attachment plate,
wherein the mechanical stop is aligned to inhibit the at least one arm from pivoting beyond the second position.

13. The propeller of claim 6, wherein the at least one arm is formed of at least one of:
a metal;
a plastic;
a wood; or
a composite material.

14. The propeller of claim 6, wherein the at least one biasing element is at least one of:
a tension spring;
a compression spring;
an extension spring;
a torsion spring;
a leaf spring; or
a constant force spring.

15. The propeller of claim 6, wherein the at least one arm comprises a first arm and a second arm,
wherein the first arm has a first weighted end and a first tapered end provided at an obtuse angle with respect to the first weighted end,
wherein the second arm has a second weighted end and a second tapered end provided at the obtuse angle with respect to the second weighted end,
wherein the first arm is pivotably mounted to the first surface of the propeller by a first fastener, and
wherein the second arm is pivotably mounted to the first surface of the propeller by a second fastener.

16. The propeller of claim 15, wherein the at least one biasing element comprises a first biasing element and a second biasing element,
wherein the first biasing element is joined to the first weighted end and the second fastener,
wherein the second biasing element is joined to the second weighted end and the first fastener,
wherein the first biasing element applies a first biasing force to the first weighted end, and
wherein the second biasing element applies a second biasing force to the second weighted end.

17. An aerial vehicle comprising:
a frame;
a platform coupled to the frame;
a first post normal to the platform;
a second post normal to the platform, wherein the first post and the second post define an axis;
a first motor; and
a first propeller rotatably coupled to the first motor,
wherein the first propeller comprises a first clutch mechanism having at least a first arm for defining one of an open position or a closed position of the first clutch mechanism, and at least one biasing element for urging at least the first arm to define the closed position of the first clutch mechanism,
wherein the axis defined by the first post and the second post is perpendicular to an axis of rotation of the propeller,
wherein the first arm is configured to pivot within a plane perpendicular to the axis of rotation of the propeller,
wherein at least a portion of the first arm is aligned to contact at least one of the first post or the second post when the first clutch mechanism is in the closed position, and
wherein the first arm is aligned to rotate without contact with either the first post or the second post when the first clutch mechanism is in the open position.

18. The aerial vehicle of claim 17, wherein a centrifugal force applied to at least the first arm exceeds a biasing force applied to the first arm by the at least one biasing element when an angular velocity of the first propeller exceeds a first predetermined threshold.

19. The aerial vehicle of claim 17, wherein the first arm is pivotably mounted to a first surface of the first propeller by a fastener,
wherein the first arm comprises a weighted end and a tapered end provided at an obtuse angle with respect to the weighted end, and
wherein a first mass of the weighted end exceeds a second mass of the tapered end.

20. The aerial vehicle of claim 17, wherein the at least one biasing element is at least one of:
a tension spring;
a compression spring;
an extension spring;
a torsion spring;
a leaf spring; or
a constant force spring.

* * * * *